Oct. 31, 1944.   F. H. HOWARD   2,361,628
MANOMETER FOR MEASURING BLOOD PRESSURE
Filed March 14, 1942
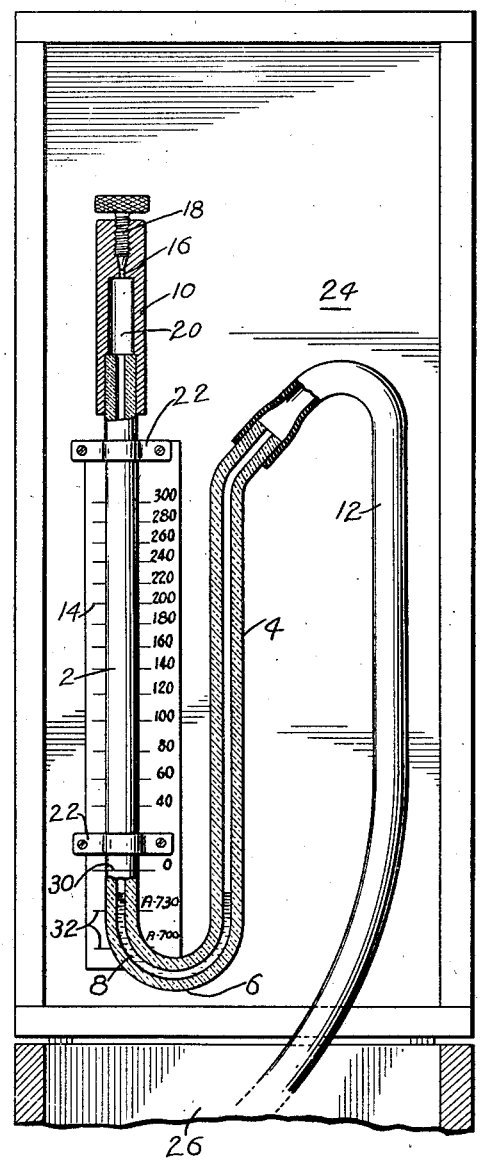
INVENTOR
FREDERICK H. HOWARD
BY
ATTORNEY Patented Oct. 31, 1944

2,361,628

UNITED STATES PATENT OFFICE 2,361,628

MANOMETER FOR MEASURING BLOOD PRESSURE

Frederick H. Howard, New York, N. Y.

Application March 14, 1942, Serial No. 434,723

3 Claims. (Cl. 73—388)

The present invention relates to manometers, more particularly to sphygmomanometers and comprises a novel instrument of this type which is simple and economical to manufacture. The new instrument can be readily calibrated and the accuracy of its scale made well within the range required in actual use.

The new sphygmomanometer differs from those now generally in use in that it utilizes the well known nearly exact reciprocal relation between the pressure and the volume of a confined quantity of gas. The new device is thus designed to measure pressure changes in the sphygmomanometer cuff by a measured change in volume of gas, specifically air, confined in a calibrated tube. For an understanding of the invention reference may be had to the accompanying drawing which is a view, partly in section, of a device embodying the invention.

The device comprises a capillary U-tube of glass or the like having the upstanding arms 2 and 4, the lower curved portion 6 and containing a liquid 8, a cylindrical member 10, preferably of monel metal or other non-corrodable material, sealed to the upper end of arm 2 and the rubber tubing 12 connected to the upper end of arm 4 and leading to the usual sphygmomanometer cuff, not shown.

A scale 14, calibrated to give blood pressure readings in millimeters, is positioned adjacent to arm 2. The member 10 has a port 16 at the upper end thereof which is controlled by a valve 18, preferably of stainless steel. A chamber 20 within member 10 communicates with the bore of the capillary tube and with the port 16. The above described device may be conveniently mounted, as by brackets 22, upon the inside of the lid 24 of the usual box, only a portion 26 of which is shown, within which the usual cuff and pressure bulb are packed when not in use.

The above described device, when the scale is properly calibrated, as hereinafter described, and when a suitable liquid is employed therein, is easy to use and will measure blood pressure well within the range of accuracy required for clinical use at atmospheric pressures normally encountered. For use in mountainous regions where the prevailing atmospheric pressure is low, either a scale 14 calibrated to take into account such low average pressures should be used or a scale calibrated for sea level atmospheric pressures could be used provided the scale is moved longitudinally along the tube to change the zero point, as hereinafter described.

When the above described device is used for measurement of blood pressure, the valve 18 is first opened and the device tipped until the level of the liquid in arm 2 rises to the zero mark of scale 14. Valve 18 is then closed and the device righted and measurements thereafter made in the usual manner. When the device is being carried, valve 18 is kept closed to prevent loss of liquid. Because of the relatively small diameter of the bore of the U-tube, the liquid remains in the tube even if the device is inverted.

A liquid suitable for use in the above described device should have a high boiling point, a low vapor pressure, a low density, a low viscosity and a low surface tension. Examples of suitable liquids are isobutyric acid and xylene. With a colorless liquid such as isobutyric acid, a suitable dye should be added in order that the meniscus can be readily seen against the scale. The vapor pressure should be low not only to avoid evaporation and loss of the liquid but also to prevent change from liquid to gas phase with changes in pressure. The density should be low to minimize hydrostatic error. The viscosity should be low to insure rapid drainage down the walls of the capillary during release of pressure. The surface tension should be low to insure good wetting of the walls of the capillary. Isobutyric acid meets all these conditions and being a fat solvent also serves to clean the walls of the capillary.

The principle upon which the above described device operates and the method of calibration of the scale will now be described.

When the valve 18 is open, the pressure of the air above the liquid 8 in arm 2 is that of the atmosphere, say $P_1$, and the volume that of the bore of arm 2 above the liquid and of chamber 20, say $V_1$. With the valve 18 closed and a pressure above that of the atmosphere, say $P_2$, applied through the tubing 12, the liquid will rise in tube 2. The pressure of the confined air will now be $P_2$, and the volume will be reduced to a value $V_2$, such that, according to Boyle's law $$V_1 P_1 = V_2 P_2$$

This may be written $$\frac{V_1 - V_2}{V_1} = \frac{P_2 - P_1}{P_2} \quad (1)$$

Now, $V_1 - V_2$ is the volume of the bore of tube 2 between the initial and final positions of the meniscus of the liquid and accordingly may be conveniently designated $a\,m$ where $a$ is the cross-sectional area of the bore and $m$ is the difference in height of the meniscus. $P_2 - P_1$ is the pressure above that of the atmosphere applied to arm 4.

If we call this applied pressure P and call the atmospheric pressure A, then Equation 1 may be written $$\frac{am}{V_1} = \frac{P}{A+P}$$

or $$m = \frac{V_1}{a} \frac{P}{A+P} \qquad (2)$$

Equation 2 may be written $$m = K \frac{P}{A+P} \qquad (3)$$

as the ratio $V_1/a$ is a constant if the measurements of the height of the meniscus are made from a fixed initial level, that is if $V_1$ is constant.

It will be apparent that the constant K for any device may be readily determined by measuring the increase in liquid level $m$ from any arbitrary zero line on arm 2 when a known pressure P plus the atmospheric pressure A is applied through arm 4. Once the value K for the instrument is thus determined, a scale 14 marked in pressures P corresponding to heights $m$ above the arbitrary zero mark can be readily made by substituting in Equation 3 the so found value of K. Preferably, however, in order that standard scales may be used, instead of arbitrarily selecting a zero mark for the scale, the particular zero mark that corresponds to a definite value of K is calculated or found by trial as will now be described with reference to a device of specific dimensions.

With a capillary tube having a bore of one and one-half millimeters diameter and with a cylinder 10, having a chamber 20 of 300 cubic millimeters, the value of K will be in the neighborhood of 250, its exact value depending, of course, upon the zero line, that is, upon the length of the capillary bore included in $V_1$. To find the position of the zero line which will makes the value of K exactly equal to 250, so that identical scales may be used on instruments of substantially the same dimensions, a calculation of the zero line position can be made on the basis of the known volume of chamber 20 and of the diameter of the bore of the arm 2.

If L is the length of tubing of arm 2 included in $V_1$ and $V_{20}$ the volume of chamber 20, then $$K = \frac{V_1}{a} = \frac{V_{20} + L_a}{a}$$

or $$L = K - \frac{V_{20}}{a} \qquad (4)$$

If the bore of the capillary tube is uniform, the zero mark determined by substitution of numerical values in Equation 4 would be accurate. It is not necessary, however, to depend upon uniformity of bore as the zero mark corresponding to a K of 250 may be found empirically. For this procedure, a tentative mark is placed at the line indicated by the computation from Equation 4. Valve 18 is opened and the device tipped until the liquid rises in arm 2 to this tentative mark. Valve 18 is then closed, the apparatus righted and a known pressure, say 150 mm. above atmospheric pressure is applied through tube 12. The increase in liquid level is carefully measured and the atmospheric pressure read. Computations from Equation 3 show that for a pressure P of 150 mm. a K of 250 and atmospheric pressure of 760, the increase in liquid level $m$ should be 41.2. If the actual increase in pressure differs from 41.2, the correction of the zero point to give a K of 250 is found from the following equation obtained by total differentiation of the equation for K.

$$dK = \frac{m}{P} dA + \frac{A+P}{P} dm \qquad (5)$$

In Equation 5, A, P and $m$ are the observed values, $dA$ is the departure of the value A from 760 and $dm$ the departure of the observed height $m$ from the value 41.2. The value of $dK$ found from Equation 5 will then be the distance in millimeters, plus or minus, that the desired permanent zero mark is from the tentative zero mark. With the permanent zero line thus found, a scratch or mark 30 is made on the arm 2 and the standard scale 14 is secured with its zero line at the mark 30 and the apparatus is ready for use. Instead of the above described method of calculating the correct position of the zero line 30 from Equation 5, a simple trial and error method might be employed. Various initial levels could be tried until a given applied pressure resulated in the correct increase in liquid level for the scale to be employed.

The above described device is accurate well within the accuracy required for clinical use. With the dimensions heretofore given each millimeter of the scale in the range of 250 millimeters of blood pressure corresponds to about 5 millimeters. If a more open scale is desired, this can be readily done by increasing the volume of chamber 20. As variations in the atmospheric pressure will affect the readings, if such variations are large, it may be desirable when the manometer is to be used regularly at high altitudes, as in the Rocky Mountains, for example, to have a scale especially calibrated for the average atmospheric pressures of that locality. This is not necessary, however, as the same scale can be used provided the scale is moved relatively to the tube to change the K of the device in accordance with the prevailing atmospheric pressure. The distance the scale should be moved can readily be computed. We know, for example, that the scale 14 is constructed so that an applied pressure of 150 mm. should give an increase in meniscus level of 41.2 mm. The K of the device when the atmospheric pressure is 700 mm. instead of 760 mm. is then shown by Equation 3 to be equal to 233.5 instead of 250. In order to utilize the scale of this atmospheric pressure, it is only necessary to move the scale upwardly until the zero line thereof is 16.5 mm., that is 250 minus 233.5, above the mark 30 on arm 2. Pressure measurements taken, using the zero of the scale as the initial liquid level, will now be accurately reflected by the readings of scale 14. Thus, a table of distances through which the scale should be moved for different atmospheric pressures could be supplied but preferably lines 32 are ruled off on the scale 14, beneath the zero line thereof representing altitudes or atmospheric pressures, these lines indicating the distances through which the scale should be moved when measurements at such altitudes or atmospheric pressures are to be made.

The invention has now been described in connection with one embodiment thereof. Obviously, various changes in construction or in the method of calibration could be made without departing from the spirit of the invention, as defined in the appended claims.

I claim:

1. A manometer for blood pressure measurements comprising in combination a U-tube having a substantially uniform bore and adapted to be positioned substantially vertically when in use, a liquid partially filling said tube, said liquid being of low viscosity and low vapor pressure and having such low density that the weight of the column thereof in either arm of said U-tube creates a pressure practically negligible compared to the pressures to be measured, a member sealed to the end of one arm of said U-tube and having a chamber communicating with the bore of the tube the volume of said chamber being larger than the volume of air within said one arm of the tube, a scale adjacent said one arm of said tube to measure changes of volume of the air trapped above the liquid in said arm with application of pressure to the other arm of said tube, said scale being calibrated to give blood pressure readings, and means including a controllable vent from said chamber for initially adjusting the volume of the trapped air.

2. A manometer according to claim 1 wherein the scale is adjustable, one arm of said U-tube has a mark with which the zero of said scale is aligned for accurate reading when the atmospheric pressure is normal and a plurality of lines on said scale corresponding to abnormal atmospheric pressures for alignment with said mark when such abnormal atmospheric pressures prevail.

3. A manometer for blood pressure measurements comprising in combination a U-tube having a substantially uniform bore, a scale adjacent one arm of said U-tube, a chamber communicating with the bore of said arm of the U-tube and provided with a controllable vent to atmosphere, and isobutyric acid within said U-tube, the volume of said chamber being greater than the volume of the column of air above the isobutyric acid in said one arm.

FREDERICK H. HOWARD.